(12) United States Patent
Sano et al.

(10) Patent No.: US 11,270,725 B2
(45) Date of Patent: Mar. 8, 2022

(54) MAGNETIC RECORDING MEDIUM HAVING CHARACTERIZED MAGNETIC LAYER, AND MAGNETIC RECORDING AND REPRODUCING APPARATUS

(71) Applicant: FUJIFILM Corporation, Tokyo (JP)

(72) Inventors: Naoki Sano, Minami-ashigara (JP); Eiki Ozawa, Minami-ashigara (JP); Norihito Kasada, Minami-ashigara (JP); Takuto Kurokawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 14 days.

(21) Appl. No.: 16/802,768

(22) Filed: Feb. 27, 2020

(65) Prior Publication Data

US 2020/0279580 A1  Sep. 3, 2020

(30) Foreign Application Priority Data

Feb. 28, 2019  (JP) .............................. JP2019-036726

(51) Int. Cl.
*G11B 5/706* (2006.01)
*G11B 5/71* (2006.01)
*G11B 5/708* (2006.01)
*G11B 5/735* (2006.01)
*G11B 5/78* (2006.01)
*G11B 5/733* (2006.01)
*G11B 5/008* (2006.01)
*G11B 5/70* (2006.01)

(52) U.S. Cl.
CPC ...... *G11B 5/70678* (2013.01); *G11B 5/00813* (2013.01); *G11B 5/7013* (2013.01); *G11B 5/7085* (2013.01); *G11B 5/70615* (2013.01); *G11B 5/71* (2013.01); *G11B 5/733* (2013.01); *G11B 5/735* (2013.01); *G11B 5/7356* (2019.05); *G11B 5/78* (2013.01)

(58) Field of Classification Search
None
See application file for complete search history.

(56) References Cited

U.S. PATENT DOCUMENTS

| | | | |
|---|---|---|---|
| 5,176,955 A * | 1/1993 | Ejiri | G11B 5/7013 427/128 |
| 6,162,528 A | 12/2000 | Ochi | |
| 8,535,817 B2 * | 9/2013 | Imaoka | G11B 5/70 428/844 |
| 9,837,116 B2 * | 12/2017 | Ozawa | G11B 5/00813 |
| 10,679,657 B2 * | 6/2020 | Kurokawa | G11B 5/127 |
| 10,741,208 B2 * | 8/2020 | Kurokawa | G11B 5/127 |
| 10,811,048 B2 * | 10/2020 | Ozawa | G11B 5/70684 |
| 2002/0098280 A1 * | 7/2002 | Otsuka | B08B 1/008 427/129 |
| 2004/0121187 A1 * | 6/2004 | Kato | G11B 5/716 428/845 |
| 2011/0274947 A1 * | 11/2011 | Ishiguro | G11B 5/7023 428/840.4 |
| 2012/0045664 A1 | 2/2012 | Tanaka et al. | |
| 2012/0196156 A1 | 8/2012 | Suzuki | |
| 2018/0182431 A1 | 6/2018 | Ozawa et al. | |
| 2019/0304488 A1 * | 10/2019 | Ozawa | G11B 5/00813 |
| 2019/0304498 A1 * | 10/2019 | Ozawa | G11B 5/127 |
| 2020/0090694 A1 * | 3/2020 | Sano | G11B 5/845 |
| 2020/0251136 A1 * | 8/2020 | Ozawa | G11B 5/78 |
| 2020/0251138 A1 * | 8/2020 | Ozawa | G11B 5/70 |
| 2020/0279580 A1 * | 9/2020 | Sano | G11B 5/78 |
| 2020/0302962 A1 * | 9/2020 | Sawayashiki | G11B 5/714 |
| 2020/0312361 A1 * | 10/2020 | Kasada | G11B 5/00817 |
| 2020/0342903 A1 * | 10/2020 | Kasada | G01B 9/02 |
| 2020/0342906 A1 * | 10/2020 | Kasada | G11B 5/00813 |
| 2020/0354178 A1 * | 11/2020 | Abe | B65H 3/54 |
| 2020/0365179 A1 * | 11/2020 | Kasada | G01B 9/02041 |
| 2021/0090600 A1 * | 3/2021 | Kurokawa | G11B 5/00813 |
| 2021/0090602 A1 * | 3/2021 | Sano | G11B 5/78 |
| 2021/0241792 A1 * | 8/2021 | Kurokawa | G11B 5/714 |

FOREIGN PATENT DOCUMENTS

| | | |
|---|---|---|
| JP | H09-115130 A | 5/1997 |
| JP | H10-124848 A | 5/1998 |
| JP | 2012-043495 A | 3/2012 |
| JP | 2012-155805 A | 8/2012 |
| JP | 2017-168178 A | 9/2017 |
| JP | 2017-224380 A | 12/2017 |
| JP | 2018-106789 A | 7/2018 |
| JP | 2019-021371 A | 2/2019 |

OTHER PUBLICATIONS

Office Action dated Jan. 18, 2022 in Japanese Patent Application No. 2019-036726.

* cited by examiner

*Primary Examiner* — Kevin M Bernatz
(74) *Attorney, Agent, or Firm* — Sughrue Mion, PLLC

(57) ABSTRACT

The magnetic recording medium includes: a non-magnetic support; and a magnetic layer including ferromagnetic powder, in which a difference ($S_{0.5}-S_{13.5}$) between a spacing $S_{0.5}$ measured on a surface of the magnetic layer by optical interferometry after n-hexane cleaning under a pressure of 0.5 atm and a spacing $S_{13.5}$ measured on the surface of the magnetic layer by optical interferometry after n-hexane cleaning under a pressure of 13.5 atm is 9.0 nm or more.

19 Claims, No Drawings

MAGNETIC RECORDING MEDIUM HAVING CHARACTERIZED MAGNETIC LAYER, AND MAGNETIC RECORDING AND REPRODUCING APPARATUS

CROSS-REFERENCE TO RELATED APPLICATIONS

This application claims priority under 35 U.S.C 119 to Japanese Patent Application No. 2019-036726 filed on Feb. 28, 2019. The above application is hereby expressly incorporated by reference, in its entirety, into the present application.

BACKGROUND OF THE INVENTION

1. Field of the Invention

The present invention relates to a magnetic recording medium and a magnetic recording and reproducing apparatus.

2. Description of the Related Art

A magnetic recording medium (for example, see JP2012-043495A, JP1997-115130A (JP-H09-115130A), and JP1998-124848A (JP-H10-124848A)) is a recording medium useful as a data storage medium for storing a large capacity of data (information) for a long period of time.

SUMMARY OF THE INVENTION

A magnetic recording medium used for data storage application may be used in a data center in which a temperature and a humidity are controlled. On the other hand, the data center is required to save power in order to reduce costs. In order to save power, it is desirable that control conditions of the temperature and the humidity in the data center can be more relaxed than a current level or the controlling can be made unnecessary. However, in a case where the control conditions of the temperature and the humidity are relaxed or the controlling is not performed, it is assumed that the magnetic recording medium is exposed to environmental changes caused by weather changes, seasonal changes, and the like. As an example of the environmental changes, a temperature change from a low temperature to a high temperature under a high humidity is used. Since the magnetic recording medium is always required to exhibit excellent electromagnetic conversion characteristics, it is desirable to provide a magnetic recording medium in which a deterioration of electromagnetic conversion characteristics after exposure to such environmental changes is suppressed more than in the magnetic recording medium of the related art.

An object of an aspect of the present invention is to provide a magnetic recording medium in which a deterioration of electromagnetic conversion characteristics after exposure to a temperature change from a low temperature to a high temperature under a high humidity is small.

An aspect of the present invention relates to a magnetic recording medium comprising: a non-magnetic support; and a magnetic layer including ferromagnetic powder, in which a difference ($S_{0.5}-S_{13.5}$) between a spacing $S_{0.5}$ measured on a surface of the magnetic layer by optical interferometry after n-hexane cleaning under a pressure of 0.5 atm and a spacing $S_{13.5}$ measured on the surface of the magnetic layer by optical interferometry after n-hexane cleaning under a pressure of 13.5 atm is 9.0 nm or more. Hereinafter, the difference ($S_{0.5}-S_{13.5}$) is also simply referred to as a "difference". In addition, 1 atm is 101325 Pa (pascal).

In an aspect, the difference may be 9.0 nm or more and 30.0 nm or less.

In an aspect, the difference may be 10.0 nm or more and 30.0 nm or less.

In an aspect, the magnetic layer may include an organic resin particle.

In an aspect, the magnetic layer may include a compound which contains an alkyl group having 5 or more carbon atoms.

In an aspect, the compound may be an organic amine compound.

In an aspect, the compound may be an organic phosphorus compound.

In an aspect, the magnetic layer may include one or more lubricants selected from the group consisting of a fatty acid, a fatty acid ester, and a fatty acid amide.

In an aspect, the magnetic recording medium may further comprise a non-magnetic layer including non-magnetic powder between the non-magnetic support and the magnetic layer.

In an aspect, the magnetic recording medium may further comprise a back coating layer including non-magnetic powder on a surface side of the non-magnetic support opposite to a surface side provided with the magnetic layer.

In an aspect, the magnetic recording medium may be a magnetic tape.

Another aspect of the present invention relates to a magnetic recording and reproducing apparatus comprising: the magnetic recording medium described above; and a magnetic head.

According to an aspect of the present invention, it is possible to provide a magnetic recording medium in which a deterioration of electromagnetic conversion characteristics after exposure to a temperature change from a low temperature to a high temperature under a high humidity is suppressed. According to an aspect of the present invention, it is possible to provide a magnetic recording and reproducing apparatus including such a magnetic recording medium.

DESCRIPTION OF THE PREFERRED EMBODIMENTS

Magnetic Recording Medium

An aspect of the present invention relates to a magnetic recording medium comprising: a non-magnetic support; and a magnetic layer including ferromagnetic powder, in which a difference ($S_{0.5}-S_{13.5}$) between a spacing $S_{0.5}$ measured on a surface of the magnetic layer by optical interferometry after n-hexane cleaning under a pressure of 0.5 atm and a spacing $S_{13.5}$ measured on the surface of the magnetic layer by optical interferometry after n-hexane cleaning under a pressure of 13.5 atm is 9.0 nm or more.

In the present invention and this specification, "n-hexane cleaning" means that a sample piece cut out from a magnetic recording medium is immersed in fresh n-hexane (200 g) having a liquid temperature of 20° C. to 25° C. and ultrasonically cleaned for 100 seconds (ultrasonic output: 40 kHz). In a case where a magnetic recording medium to be cleaned is a magnetic tape, a sample piece having a length of 5 cm is cut out and subjected to n-hexane cleaning. A width of the magnetic tape and a width of the sample piece cut out from the magnetic tape are usually ½ inches. 1 inch is 0.0254 meters. For also magnetic tapes other than that having ½ inches width, a sample piece having a length of 5 cm may be cut out and subjected to n-hexane cleaning. In a case where a magnetic recording medium to be cleaned is a magnetic disk, a sample piece having a size of 5 cm×1.27 cm is cut out and subjected to n-hexane cleaning. A measurement of a spacing which will be described in detail below is performed after a sample piece after n-hexane cleaning is left under an environment of a temperature of 23° C. and a relative humidity of 50% for 24 hours.

In the present invention and this specification, a "magnetic layer surface" of the magnetic recording medium is identical to a surface of the magnetic recording medium on a magnetic layer side.

In the present invention and this specification, a spacing measured on the magnetic layer surface of the magnetic recording medium by optical interferometry is a value measured by the following method.

In a state where the magnetic recording medium (specifically, the above sample piece. The same applies hereinafter) and a transparent plate member (for example, a glass plate or the like) are superposed such that the magnetic layer surface of the magnetic recording medium faces the transparent plate member, a pressing member is pressed at a pressure of 0.5 atm or 13.5 atm from a side opposite to a side of the magnetic layer of the magnetic recording medium. In this state, the magnetic layer surface of the magnetic recording medium is irradiated with light through the transparent plate member (irradiation region: 150,000 to 200,000 µm$^2$), and a spacing (distance) between the magnetic layer surface of the magnetic recording medium and the magnetic recording medium side surface of the transparent plate member is obtained based on an intensity of interference light (for example, a contrast of an interference fringe image) generated by an optical path difference between reflected light from the magnetic layer surface of the magnetic recording medium and reflected light from the magnetic recording medium side surface of the transparent plate member. Here, emitted light is not particularly limited. In a case where emitted light is light having a light emission wavelength over a relatively wide wavelength range, such as white light having light with a plurality of wavelengths, a member, such as an interference filter, which has a function of selectively cutting light with a specific wavelength or light other than light in a specific wavelength region is disposed between the transparent plate member and a light receiving section that receives reflected light, and light of some wavelengths or light in some wavelength regions in reflected light is selectively incident on the light receiving section. In a case where light to be emitted is light having a single emission peak (so-called monochromatic light), the member may not be used. As an example, a wavelength of light incident on the light receiving section can be in a range of 500 to 700 nm, for example. However, a wavelength of light incident on the light receiving section is not limited to the above range. Moreover, the transparent plate member may be a member having transparency which allows emitted light to pass therethrough to such an extent that the interference light can be obtained by irradiating a magnetic recording medium with light through this member.

An interference fringe image obtained by the above spacing measurement is divided into 300,000 points to obtain a spacing of each point (a distance between the magnetic layer surface of the magnetic recording medium and the magnetic recording medium side surface of the transparent plate member), and thus this is used as a histogram and a mode value in the histogram is used as a spacing.

Five sample pieces are cut out from the same magnetic recording medium, and for each sample piece, after n-hexane cleaning, the pressing member is pressed at a pressure of 0.5 atm to obtain a spacing and further the pressing member is pressed at a pressure of 13.5 atm to obtain a spacing. Therefore, an arithmetic average of the spacings obtained under a pressure of 0.5 atm after n-hexane cleaning for the five sample pieces is used as a spacing $S_{0.5}$, and an arithmetic average of the spacings obtained under a pressure of 13.5 atm after n-hexane cleaning for the five sample pieces is used as a spacing $S_{13.5}$. A difference $(S_{0.5}-S_{13.5})$ between $S_{0.5}$ and $S_{13.5}$ obtained as above is used as a difference $(S_{0.5}-S_{13.5})$ for the magnetic recording medium.

The above measurement can be performed using, for example, a commercially available tape spacing analyzer (tape spacing analyzer; TSA) such as tape spacing analyzer manufactured by Micro Physics. Spacing measurement in the examples was performed using a tape spacing analyzer manufactured by Micro Physics.

In the magnetic recording medium, a difference $(S_{0.5}-S_{13.5})$ between a spacing $S_{0.5}$ and a spacing $S_{13.5}$ which are respectively measured, after n-hexane cleaning, under a pressure of 0.5 atm and a pressure of 13.5 atm on a magnetic layer surface by optical interferometry is 9.0 nm or more. Therefore, according to the magnetic recording medium, it is possible to suppress a deterioration of electromagnetic conversion characteristics after exposure to a temperature change from a low temperature to a high temperature under a high humidity. A supposition of the present inventors regarding this point is as follows.

The reproducing of data recorded on the magnetic recording medium is generally performed by causing the magnetic layer surface and a magnetic head (hereinafter, simply referred to as a "head".) to come into contact with each other for sliding. A portion that mainly contacts (so-called true contact) the head during the sliding is considered to be a protrusion present on the magnetic layer surface. The spacing obtained by the above method can be a value corresponding to a height of the protrusion on the magnetic layer surface to which the pressure is applied. The present inventors have conducted intensive study, and as a result, the present inventors reach a conclusion that in a case where the sliding with the magnetic head is repeated, a pressure applied to the magnetic layer surface is not constant and a large pressure may be applied, and thus scrapings generated by scraping the protrusion on the magnetic layer surface in a case where a large pressure is applied are interposed between the magnetic layer surface and the head by adhering to the head, which causes a deterioration of electromagnetic conversion characteristics. As a case where the above described large pressure is applied, for example, a contact with an edge portion of the magnetic head is considered.

On the other hand, in a case where a temperature change from a low temperature to a high temperature occurs under a high humidity, it is considered that condensation (adhesion of moisture) occurs on the magnetic layer surface of the magnetic recording medium. It is supposed that presence of the moisture causes increase of a friction coefficient during sliding between the magnetic layer surface and the magnetic head. Accordingly, it is considered that the protrusion on the magnetic layer surface is more easily scraped in a case where the large pressure is applied, and thus the scrapings are easily generated. With respect to this, it is considered that the difference $(S_{0.5}-S_{13.5})$ between $S_{0.5}$ and $S_{13.5}$ obtained by the above method is as large as 9.0 nm or more, which indicates that the magnetic layer is easily deformed in a case where such a large pressure is applied (for example, the protrusion on the magnetic layer surface tends to sink into the inside of the magnetic layer). It is supposed that easy deformation of the magnetic layer by receiving such a large pressure contributes to suppression of scraping of the protrusion on the magnetic layer surface in a case where the large pressure is applied. It is considered that this aspect leads to suppression of a deterioration of electromagnetic conversion characteristics after exposure to a temperature change from a low temperature to a high temperature under a high humidity.

The present invention is not limited to the above supposition. In addition, the present invention is not limited to other suppositions of the present inventors described in this specification. By the way, regarding the pressure during pressing in the spacing measurement, in the present invention, 0.5 atm is used as an exemplary value of the pressure mainly applied to the magnetic layer surface during sliding with the magnetic head, and 13.5 atm is used as an exemplary value of the large pressure applied to the magnetic layer surface during sliding with the magnetic head. However, a pressure applied to the magnetic recording medium during sliding with the magnetic head is not limited to the above pressure.

Hereinafter, the magnetic recording medium will be described later in detail.

Magnetic Layer

Difference ($S_{0.5}$–$S_{13.5}$)

In the magnetic recording medium, the difference is 9.0 nm or more, and is preferably 9.5 nm or more and more preferably 10.0 nm or more from a viewpoint of more suppressing the deterioration of the above electromagnetic conversion characteristics. In addition, from a viewpoint of still more suppressing the deterioration of the above electromagnetic conversion characteristics, the difference is preferably 30.0 nm or less, more preferably 25.0 nm or less, still more preferably 20.0 nm, still more preferably 18.0 nm or less, and still more preferably 16.0 nm or less. The difference can be controlled by a type of a non-magnetic filler (hereinafter, referred to as a "protrusion forming agent") capable of forming a protrusion on the magnetic layer surface and a manufacturing condition of the magnetic recording medium. Details of this point will be described later.

$S_{0.5}$ and $S_{13.5}$ of the magnetic recording medium are not particularly limited as long as the difference is 9.0 nm or more. $S_{0.5}$ is preferably 10.0 nm or more, more preferably 12.0 nm or more, and still more preferably 15.0 nm or more mainly from a viewpoint of improving electromagnetic conversion characteristics at an initial sliding between the magnetic layer surface and the magnetic head. In addition, from the same viewpoint, $S_{0.5}$ is preferably 40.0 nm or less, more preferably 38.0 nm or less, and still more preferably 35.0 nm or less. From a viewpoint of still more suppressing a deterioration of electromagnetic conversion characteristics after exposure to a temperature change from a low temperature to a high temperature under a high humidity, $S_{13.5}$ is preferably 3.0 nm or more, more preferably 4.0 nm or more, and still more preferably 5.0 nm or more. From the same viewpoint, $S_{13.5}$ is preferably 20.0 nm or less, more preferably 18.0 nm or less, and still more preferably 15.0 nm or less.

Ferromagnetic Powder

A magnetic layer includes ferromagnetic powder. As the ferromagnetic powder included in the magnetic layer, one or a combination of two or more known ferromagnetic powders that are ferromagnetic powder used in the magnetic layer of various magnetic recording media, may be used. It is preferable to use ferromagnetic powder having a small average particle size, from a viewpoint of improvement of recording density. In this respect, an average particle size of the ferromagnetic powder is preferably 50 nm or less, more preferably 45 nm or less, still more preferably 40 nm or less, still more preferably 35 nm or less, still more preferably 30 nm or less, still more preferably 25 nm or less, and still more preferably 20 nm or less. On the other hand, from a viewpoint of magnetization stability, an average particle size of the ferromagnetic powder is preferably 5 nm or more, more preferably 8 nm or more, still more preferably 10 nm or more, still more preferably 15 nm or more, and still more preferably 20 nm or more.

Hexagonal Ferrite Powder

Preferable specific examples of ferromagnetic powder may include hexagonal ferrite powder. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the present invention and this specification, "hexagonal ferrite powder" refers to ferromagnetic powder in which a hexagonal ferrite type crystal structure is detected as a main phase by X-ray diffraction analysis. The main phase refers to a structure to which the highest intensity diffraction peak in an X-ray diffraction spectrum obtained by X-ray diffraction analysis is attributed. For example, in a case where the highest intensity diffraction peak is attributed to a hexagonal ferrite type crystal structure in an X-ray diffraction spectrum obtained by X-ray diffraction analysis, it is determined that the hexagonal ferrite type crystal structure is detected as the main phase. In a case where only a single structure is detected by X-ray diffraction analysis, this detected structure is taken as the main phase. The hexagonal ferrite type crystal structure includes at least an iron atom, a divalent metal atom and an oxygen atom, as a constituent atom. The divalent metal atom is a metal atom that can be a divalent cation as an ion, and examples thereof may include an alkaline earth metal atom such as a strontium atom, a barium atom, and a calcium atom, a lead atom, and the like. In the present invention and this specification, the hexagonal strontium ferrite powder means that the main divalent metal atom included in the powder is a strontium atom. In addition, the hexagonal barium ferrite powder means that the main divalent metal atom included in this powder is a barium atom. The main divalent metal atom refers to a divalent metal atom that accounts for the most on an at % basis among divalent metal atoms included in the powder. Here, a rare earth atom is not included in the above divalent metal atom. The "rare earth atom" in the present invention and this specification is selected from the group consisting of a scandium atom (Sc), a yttrium atom (Y), and a lanthanoid atom. The Lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder which is an aspect of the hexagonal ferrite powder will be described in more detail.

An activation volume of the hexagonal strontium ferrite powder is preferably in a range of 800 to 1600 nm³. The particulate hexagonal strontium ferrite powder exhibiting an activation volume in the above range is suitable for manufacturing a magnetic recording medium exhibiting excellent electromagnetic conversion characteristics. An activation volume of the hexagonal strontium ferrite powder is preferably 800 nm³ or more, and may be, for example, 850 nm³ or more. Further, from a viewpoint of further improving electromagnetic conversion characteristics, an activation volume of the hexagonal strontium ferrite powder is more preferably 1500 nm³ or less, still more preferably 1400 nm³ or less, still more preferably 1300 nm³ or less, still more preferably 1200 nm³ or less, and still more preferably 1100 nm³ or less. The same applies to an activation volume of the hexagonal barium ferrite powder.

The "activation volume" is a unit of magnetization reversal and is an index indicating a magnetic size of a particle. An activation volume described in the present invention and this specification and an anisotropy constant Ku which will be described later are values obtained from the following relational expression between a coercivity Hc and an activation volume V, by performing measurement in an He measurement portion at a magnetic field sweep rate of 3 minutes and 30 minutes using a vibrating sample magnetometer (measurement temperature: 23° C.±1° C.). In a unit of the anisotropy constant Ku, 1 erg/cc=1.0×10⁻¹ J/m³.

$$Hc=2Ku/Ms\{1-[(kT/KuV)\ln(At/0.693)]^{1/2}\}$$

[In the above formula, Ku: anisotropy constant (unit: J/m³), Ms: saturation magnetization (Unit: kA/m), k: Boltzmann constant, T: absolute temperature (unit: K), V: activation volume (unit: cm³), A: spin precession frequency (unit: s⁻¹), t: magnetic field reversal time (unit: s)]

An index for reducing thermal fluctuation, in other words, improving thermal stability may include an anisotropy constant Ku. The hexagonal strontium ferrite powder may preferably have Ku of 1.8×10⁵ J/m³ or more, and more preferably have a Ku of 2.0×10⁵ J/m³ or more. Ku of the hexagonal strontium ferrite powder may be, for example, 2.5×10⁵ J/m³ or less. Here, it means that the higher Ku is, the higher thermal stability is, this is preferable, and thus, a value thereof is not limited to the values exemplified above.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 at % with respect to 100 at % of an iron atom. In an aspect, the hexagonal strontium ferrite powder including a rare earth atom may have a rare earth atom surface layer portion uneven distribution property. In the present invention and this specification, the "rare earth atom surface layer portion uneven distribution property" means that a rare earth atom content with respect to 100 at % of an iron atom in a solution obtained by partially dissolving hexagonal strontium ferrite powder with an acid (hereinafter, referred to as a "rare earth atom surface layer portion content" or simply a "surface layer portion content" for a rare earth atom) and a rare earth atom content with respect to 100 at % of an iron atom in a solution obtained by totally dissolving hexagonal strontium ferrite powder with an acid (hereinafter, referred to as a "rare earth atom bulk content" or simply a "bulk content" for a rare earth atom) satisfy a ratio of a rare earth atom surface layer portion content/a rare earth atom bulk content >1.0. A rare earth atom content in hexagonal strontium ferrite powder which will be described later is the same meaning as the rare earth atom bulk content. On the other hand, partial dissolution using an acid dissolves a surface layer portion of a particle configuring hexagonal strontium ferrite powder, and thus, a rare earth atom content in a solution obtained by partial dissolution is a rare earth atom content in a surface layer portion of a particle configuring hexagonal strontium ferrite powder. A rare earth atom surface layer portion content satisfying a ratio of "rare earth atom surface layer portion content/rare earth atom bulk content >1.0" means that in a particle of hexagonal strontium ferrite powder, rare earth atoms are unevenly distributed in a surface layer portion (that is, more than an inside). The surface layer portion in the present invention and this specification means a partial region from a surface of a particle configuring hexagonal strontium ferrite powder toward an inside.

In a case where hexagonal strontium ferrite powder includes a rare earth atom, a rare earth atom content (bulk content) is preferably in a range of 0.5 to 5.0 at % with respect to 100 at % of an iron atom. It is considered that a bulk content in the above range of the included rare earth atom and uneven distribution of the rare earth atoms in a surface layer portion of a particle configuring hexagonal strontium ferrite powder contribute to suppression of a decrease in reproducing output in repeated reproduction. It is supposed that this is because hexagonal strontium ferrite powder includes a rare earth atom with a bulk content in the above range, and rare earth atoms are unevenly distributed in a surface layer portion of a particle configuring hexagonal strontium ferrite powder, and thus it is possible to increase an anisotropy constant Ku. The higher a value of an anisotropy constant Ku is, the more a phenomenon called so-called thermal fluctuation can be suppressed (in other words, thermal stability can be improved). By suppressing occurrence of thermal fluctuation, it is possible to suppress a decrease in reproducing output during repeated reproduction. It is supposed that uneven distribution of rare earth atoms in a particulate surface layer portion of hexagonal strontium ferrite powder contributes to stabilization of spins of iron (Fe) sites in a crystal lattice of a surface layer portion, and thus, an anisotropy constant Ku may be increased.

Moreover, it is supposed that the use of hexagonal strontium ferrite powder having a rare earth atom surface layer portion uneven distribution property as a ferromagnetic powder in the magnetic layer also contributes to inhibition of a magnetic layer surface from being scraped by being slid with respect to the magnetic head. That is, it is supposed that hexagonal strontium ferrite powder having rare earth atom surface layer portion uneven distribution property can also contribute to an improvement of running durability of the magnetic recording medium. It is supposed that this may be because uneven distribution of rare earth atoms on a surface of a particle configuring hexagonal strontium ferrite powder contributes to an improvement of interaction between the particle surface and an organic substance (for example, a binding agent and/or an additive) included in the magnetic layer, and, as a result, a strength of the magnetic layer is improved.

From a viewpoint of further suppressing a decrease in reproducing output during repeated reproduction and/or a viewpoint of further improving the running durability, the rare earth atom content (bulk content) is more preferably in a range of 0.5 to 4.5 at %, still more preferably in a range of 1.0 to 4.5 at %, and still more preferably in a range of 1.5 to 4.5 at %.

The bulk content is a content obtained by totally dissolving hexagonal strontium ferrite powder. In the present invention and this specification, unless otherwise noted, the content of an atom means a bulk content obtained by totally dissolving hexagonal strontium ferrite powder. The hexagonal strontium ferrite powder including a rare earth atom may include only one kind of rare earth atom as the rare earth atom, or may include two or more kinds of rare earth atoms.

The bulk content in the case of including two or more types of rare earth atoms is obtained for the total of two or more types of rare earth atoms. This also applies to other components in the present invention and this specification. That is, unless otherwise noted, a certain component may be used alone or in combination of two or more. A content amount or content in a case where two or more components are used refers to that for the total of two or more components.

In a case where the hexagonal strontium ferrite powder includes a rare earth atom, the included rare earth atom may be any one or more of rare earth atoms. As a rare earth atom that is preferable from a viewpoint of further suppressing a decrease in reproducing output in repeated reproduction, there are a neodymium atom, a samarium atom, a yttrium atom, and a dysprosium atom, here, the neodymium atom, the samarium atom, and the yttrium atom are more preferable, and a neodymium atom is still more preferable.

In the hexagonal strontium ferrite powder having a rare earth atom surface layer portion uneven distribution property, the rare earth atoms may be unevenly distributed in the surface layer portion of a particle configuring the hexagonal strontium ferrite powder, and the degree of uneven distribution is not limited. For example, for a hexagonal strontium ferrite powder having a rare earth atom surface layer portion uneven distribution property, a ratio between a surface layer portion content of a rare earth atom obtained by partial dissolution under dissolution conditions which will be described later and a bulk content of a rare earth atom obtained by total dissolution under dissolution conditions which will be described later, that is, "surface layer portion content/bulk content" exceeds 1.0 and may be 1.5 or more. A "surface layer portion content/bulk content" larger than 1.0 means that in a particle configuring the hexagonal strontium ferrite powder, rare earth atoms are unevenly distributed in the surface layer portion (that is, more than in the inside). Further, a ratio between a surface layer portion content of a rare earth atom obtained by partial dissolution under dissolution conditions which will be described later and a bulk content of a rare earth atom obtained by total dissolution under the dissolution conditions which will be described later, that is, "surface layer portion content/bulk content" may be, for example, 10.0 or less, 9.0 or less, 8.0 or less, 7.0 or less, 6.0 or less, 5.0 or less, or 4.0 or less. Here, in the hexagonal strontium ferrite powder having a rare earth atom surface layer portion uneven distribution property, the rare earth atoms may be unevenly distributed in the surface layer portion of a particle configuring the hexagonal strontium ferrite powder, and the "surface layer portion content/bulk content" is not limited to the illustrated upper limit or lower limit.

The partial dissolution and the total dissolution of the hexagonal strontium ferrite powder will be described below. For the hexagonal strontium ferrite powder that exists as a powder, the partially and totally dissolved sample powder is taken from the same lot of powder. On the other hand, for the hexagonal strontium ferrite powder included in the magnetic layer of the magnetic recording medium, a part of the hexagonal strontium ferrite powder taken out from the magnetic layer is subjected to partial dissolution, and the other part is subjected to total dissolution. The hexagonal strontium ferrite powder can be taken out from the magnetic layer by a method described in a paragraph 0032 of JP2015-091747A, for example.

The partial dissolution means that dissolution is performed such that, at the end of dissolution, the residue of the hexagonal strontium ferrite powder can be visually checked in the solution. For example, by partial dissolution, it is possible to dissolve a region of 10 to 20 mass % of the particle configuring the hexagonal strontium ferrite powder with the total particle being 100 mass %. On the other hand, the total dissolution means that dissolution is performed such that, at the end of dissolution, the residue of the hexagonal strontium ferrite powder cannot be visually checked in the solution.

The partial dissolution and measurement of the surface layer portion content are performed by the following method, for example. Here, the following dissolution conditions such as an amount of sample powder are illustrative, and dissolution conditions for partial dissolution and total dissolution can be employed in any manner.

A container (for example, a beaker) containing 12 mg of sample powder and 10 mL of 1 mol/L hydrochloric acid is held on a hot plate at a set temperature of 70° C. for 1 hour. The obtained solution is filtered by a membrane filter of 0.1 μm. Elemental analysis of the filtrated solution is performed by an inductively coupled plasma (ICP) analyzer. In this way, the surface layer portion content of a rare earth atom with respect to 100 at % of an iron atom can be obtained. In a case where a plurality of types of rare earth atoms are detected by elemental analysis, the total content of all rare earth atoms is defined as the surface layer portion content. This also applies to the measurement of the bulk content.

On the other hand, the total dissolution and measurement of the bulk content are performed by the following method, for example.

A container (for example, a beaker) containing 12 mg of sample powder and 10 mL of 4 mol/L hydrochloric acid is held on a hot plate at a set temperature of 80° C. for 3 hours. Thereafter, the method is carried out in the same manner as the partial dissolution and the measurement of the surface layer portion content, and the bulk content with respect to 100 at % of an iron atom can be obtained.

From a viewpoint of increasing the reproducing output in a case of reproducing data recorded on the magnetic recording medium, it is desirable that mass magnetization σs of the ferromagnetic powder included in the magnetic recording medium is high. In this regard, the hexagonal strontium ferrite powder including a rare earth atom but not having the rare earth atom surface layer portion uneven distribution property tends to have σs largely lower than the hexagonal strontium ferrite powder including no rare earth atom. On the other hand, it is considered that hexagonal strontium ferrite powder having a rare earth atom surface layer portion uneven distribution property is preferable in suppressing such a large decrease in σs. In an aspect, σs of the hexagonal strontium ferrite powder may be 45 A·m$^2$/kg or more, and may be 47 A·m$^2$/kg or more. On the other hand, from a viewpoint of noise reduction, σs is preferably 80 A·m$^2$/kg or less and more preferably 60 A·m$^2$/kg or less. σs can be measured using a known measuring device, such as a vibrating sample magnetometer, capable of measuring magnetic properties. In the present invention and this specification, unless otherwise noted, the mass magnetization σs is a value measured at a magnetic field intensity of 15 kOe. 1 [kOe] is $10^6/4\pi$ [A/m].

Regarding the content (bulk content) of a constituent atom of the hexagonal strontium ferrite powder, a strontium atom content may be, for example, in a range of 2.0 to 15.0 at % with respect to 100 at % of an iron atom. In an aspect, in the hexagonal strontium ferrite powder, a divalent metal atom included in the powder may be only a strontium atom. In another aspect, the hexagonal strontium ferrite powder may include one or more other divalent metal atoms in addition to a strontium atom. For example, a barium atom and/or a calcium atom may be included. In a case where another divalent metal atom other than a strontium atom is included, a barium atom content and a calcium atom content in the hexagonal strontium ferrite powder are, for example, in a range of 0.05 to 5.0 at % with respect to 100 at % of an iron atom, respectively.

As a crystal structure of hexagonal ferrite, a magnetoplumbite type (also called an "M type"), a W type, a Y type, and a Z type are known. The hexagonal strontium ferrite powder may have any crystal structure. The crystal structure can be checked by X-ray diffraction analysis. In the hexagonal strontium ferrite powder, a single crystal structure or two or more crystal structures may be detected by X-ray diffraction analysis. For example, according to an aspect, in the hexagonal strontium ferrite powder, only the M-type crystal structure may be detected by X-ray diffraction analysis. For example, M-type hexagonal ferrite is represented by a composition formula of $AFe_{12}O_{19}$. Here, A represents a divalent metal atom, and in a case where the hexagonal strontium ferrite powder is the M-type, A is only a strontium atom (Sr), or in a case where, as A, a plurality of divalent metal atoms are included, as described above, a strontium atom (Sr) accounts for the most on an at % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, and an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom can be, for example, 0.5 to 10.0 at % with respect to 100 at % of an iron atom. From a viewpoint of further suppressing a decrease in reproducing output in repeated reproduction, the hexagonal strontium ferrite powder includes an iron atom, a strontium atom, an oxygen atom, and a rare earth atom, and the content of atoms other than these atoms is preferably 10.0 at % or less, more preferably in a range of 0 to 5.0 at %, and may be 0 at % with respect to 100 at % of an iron atom. That is, in an aspect, the hexagonal strontium ferrite powder may not include atoms other than an iron atom, a strontium atom, an oxygen atom, and a rare earth atom. The content expressed in at % is obtained by converting a content of each atom (unit: mass %) obtained by totally dissolving hexagonal strontium ferrite powder into a value expressed in at % using an atomic weight of each atom. Further, in the present invention and this specification, "not include" for a certain atom means that a content measured by an ICP analyzer after total dissolution is 0 mass %. A detection limit of the ICP analyzer is usually 0.01 parts per million (ppm) or less on a mass basis. The "not included" is used as a meaning including that an atom is included in an amount less than the detection limit of the ICP analyzer. In an aspect, the hexagonal strontium ferrite powder may not include a bismuth atom (Bi).

Metal Powder

Preferable specific examples of the ferromagnetic powder include ferromagnetic metal powder. For details of the ferromagnetic metal powder, descriptions disclosed in paragraphs 0137 to 0141 of JP2011-216149A and paragraphs 0009 to 0023 of JP2005-251351A can be referred to.

ε-Iron Oxide Powder

Preferable specific examples of the ferromagnetic powder include ε-iron oxide powder. In the present invention and this specification, "ε-iron oxide powder" refers to ferromagnetic powder in which a ε-iron oxide type crystal structure is detected as a main phase by X-ray diffraction analysis. For example, in a case where the highest intensity diffraction peak is attributed to a ε-iron oxide type crystal structure in an X-ray diffraction spectrum obtained by X-ray diffraction analysis, it is determined that the ε-iron oxide type crystal structure is detected as the main phase. As a manufacturing method of the ε-iron oxide powder, a manufacturing method from a goethite, a reverse micelle method, and the like are known. All of the manufacturing methods are well known. Regarding a method of manufacturing ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. 51, pp. 5280 to 5284, J. Mater. Chem. C, 2013, 1, pp. 5200 to 5206 can be referred to, for example. Here, the manufacturing method of ε-iron oxide powder capable of being used as the ferromagnetic powder in the magnetic layer of the magnetic recording medium is not limited to the methods described here.

An activation volume of the ε-iron oxide powder is preferably in a range of 300 to 1,500 $nm^3$. The particulate ε-iron oxide powder exhibiting an activation volume in the above range is suitable for manufacturing a magnetic recording medium exhibiting excellent electromagnetic conversion characteristics. An activation volume of the ε-iron oxide powder is preferably 300 $nm^3$ or more, and may be, for example, 500 $nm^3$ or more. Further, from a viewpoint of further improving electromagnetic conversion characteristics, an activation volume of the ε-iron oxide powder is more preferably 1,400 $nm^3$ or less, still more preferably 1,300 $nm^3$ or less, still more preferably 1,200 $nm^3$ or less, and still more preferably 1,100 $nm^3$ or less.

An index for reducing thermal fluctuation, in other words, improving thermal stability may include an anisotropy constant Ku. The ε-iron oxide powder preferably has Ku of $3.0 \times 10^4$ $J/m^3$ or more, and more preferably has Ku of $8.0 \times 10^4$ $J/m^3$ or more. Ku of the ε-iron oxide powder may be, for example, $3.0 \times 10^5$ $J/m^3$ or less. Here, it means that the higher Ku is, the higher thermal stability is, this is preferable, and thus, a value thereof is not limited to the values exemplified above.

From a viewpoint of increasing the reproducing output in a case of reproducing data recorded on the magnetic recording medium, it is desirable that mass magnetization σs of the ferromagnetic powder included in the magnetic recording medium is high. In this regard, in an aspect, σs of the ε-iron oxide powder may be 8 $A \cdot m^2/kg$ or more, and may be 12 $A \cdot m^2/kg$ or more. On the other hand, from a viewpoint of noise reduction, σs of the ε-iron oxide powder is preferably 40 $A \cdot m^2/kg$ or less and more preferably 35 $A \cdot m^2/kg$ or less.

In the present invention and this specification, unless otherwise noted, an average particle size of various powders such as the ferromagnetic powder is a value measured by the following method using a transmission electron microscope.

The powder is imaged at a magnification ratio of 100,000 with a transmission electron microscope, and the image is printed on printing paper or is displayed on a display so that the total magnification ratio becomes 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetic average of the particle sizes of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using a transmission electron microscope H-9000 manufactured by Hitachi, Ltd. as the transmission electron microscope, and image analysis software KS-400 manufactured by Carl Zeiss as the image analysis software, unless otherwise noted. In the present invention and this specification, the powder means an aggregate of a plurality of particles. For example, ferromagnetic powder means an aggregate of a plurality of ferromagnetic particles. Further, the aggregate of the plurality of particles not only includes an aspect in which particles configuring the aggregate directly come into contact with each other, but also includes an aspect in which a binding agent or an additive which will be described later is interposed between the particles. The term "particle" is used to describe a powder in some cases.

As a method of taking sample powder from the magnetic recording medium in order to measure the particle size, a method disclosed in a paragraph 0015 of JP2011-048878A can be used, for example.

In the present invention and this specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of each of the particles is measured in the measurement described above, a value of (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

A content (filling percentage) of the ferromagnetic powder of the magnetic layer is preferably in a range of 50 to 90 mass % and more preferably in a range of 60 to 90 mass %. The magnetic layer includes at least the ferromagnetic powder, can include a binding agent, and can optionally include one or more additional additives. A high filling percentage of the ferromagnetic powder in the magnetic layer is preferable from a viewpoint of improvement of recording density.

Binding Agent and Curing Agent

The magnetic recording medium may be a coating type magnetic recording medium and may include a binding agent in the magnetic layer. The binding agent is one or more kinds of resins. As the binding agent, various resins usually used as a binding agent of a coating type magnetic recording medium can be used. For example, as the binding agent, a resin selected from a polyurethane resin, a polyester resin, a polyimide resin, a vinyl chloride resin, an acrylic resin obtained by copolymerizing styrene, acrylonitrile, methyl methacrylate, or the like, a cellulose resin such as nitrocellulose, an epoxy resin, a phenoxy resin, and a polyvinylalkylal resin such as polyvinyl acetal or polyvinyl butyral can be used alone or a plurality of the resins can be mixed with each other to be used. Among these, a polyurethane resin, an acrylic resin, a cellulose resin, and a vinyl chloride resin are preferable. These resins may be homopolymers or copolymers. These resins can be used as the binding agent even in a non-magnetic layer and/or a back coating layer which will be described later. For the binding agent described above, descriptions disclosed in paragraphs 0028 to 0031 of JP2010-024113A can be referred to. In addition, the binding agent may be a radiation curable resin such as an electron beam-curable resin. For the radiation curable resin, descriptions disclosed in paragraphs 0044 and 0045 of JP2011-048878A can be referred to. The binding agent can be used in a magnetic layer forming composition in an amount of, for example, 1.0 to 30.0 parts by mass with respect to 100.0 parts by mass of the ferromagnetic powder. An average molecular weight of the resin used as the binding agent can be, for example, 10,000 or more and 200,000 or less as a weight-average molecular weight. The weight-average molecular weight in the present invention and this specification is, by gel permeation chromatography (GPC), a value obtained by performing polystyrene conversion of a value measured under the following measurement conditions. The weight-average molecular weight of the binding agent shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mm ID (inner diameter)×30.0 cm)

Eluent: Tetrahydrofuran (THF)

In addition, a curing agent can also be used together with the binding agent. As the curing agent, in an aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in a manufacturing process of the magnetic recording medium. The preferred curing agent is a thermosetting compound, and polyisocyanate is suitable for this. For details of the polyisocyanate, descriptions disclosed in paragraphs 0124 and 0125 of JP2011-216149A can be referred to. The curing agent can be used in the magnetic layer forming composition in an amount of, for example, 0 to 80.0 parts by mass, and preferably 50.0 to 80.0 parts by mass, from a viewpoint of improvement of a strength of each layer such as the magnetic layer, with respect to 100.0 parts by mass of the binding agent.

Other Components

The magnetic layer may include, as necessary, one or more additives together with the various components described above. As the additive, a commercially available product can be suitably selected and used according to the desired properties, or a compound synthesized by a well-known method can also be used as an additive. As an example of the additive, the above curing agent is used. In addition, examples of the additive which can be included in the magnetic layer include a non-magnetic filler, a lubricant, a dispersing agent, a dispersing assistant, an antibacterial agent, an antistatic agent, and an antioxidant. The non-magnetic filler is identical to a non-magnetic particle or non-magnetic powder. Examples of the non-magnetic filler include a protrusion forming agent and a non-magnetic filler (hereinafter, referred to as an "abrasive") that can function as the additive, a well-known additive such as various polymers disclosed in paragraphs 0030 to 0080 of JP2016-051493A can be used.

Non-Magnetic Filler

As the protrusion forming agent which is an aspect of the non-magnetic filler, from a viewpoint of easiness of controlling of the difference ($S_{0.5}$–$S_{13.5}$), it is preferable to use an organic substance particle, and more preferable to use an organic resin particle. The organic resin particle means a particle containing an organic resin as a main component. The main component means a component that accounts for the most on a mass basis among components configuring the particle, and can be, for example, a component that accounts for 80 mass % to 100 mass %.

Examples of the organic resin configuring the organic resin particle include an acrylic resin, a melamine resin, a fluororesin, a benzoguanamine resin, and a vinyl resin. The acrylic resin includes a methacrylic resin. The organic resin configuring the organic resin particle may be a homopolymer or a copolymer. As the organic resin particle, a commercially available product may be used, or a particle manufactured by a well-known method may be used.

$S_{0.5}$ described above can be controlled mainly by a particle size of a protrusion forming agent. An average particle size of the protrusion forming agent, for example, is 30 nm to 4 µm, preferably 30 nm to 2 µm, and more preferably 40 nm to 1 µm. On the other hand, $S_{13.5}$ can be controlled by a preparation method of a magnetic layer forming composition in addition to the particle size of a protrusion forming agent. This point will be described later. A density of the protrusion forming agent can be, for example, in a range of 0.5 to 3.0 g/cm$^3$, and is preferably in a range of 0.8 to 2.5 g/cm$^3$ from a viewpoint of improving electromagnetic conversion characteristics at an initial sliding between the magnetic layer surface and the magnetic head. The density of the protrusion forming agent is a value obtained by a pycnometer method.

The abrasive which is another aspect of the non-magnetic filler is preferably non-magnetic powder having a Mohs hardness of more than 8, and more preferably non-magnetic powder having a Mohs hardness of 9 or more. With respect to this, a Mohs hardness of the protrusion forming agent can be, for example, 8 or less or 7 or less. A maximum value of a Mohs hardness is 10 for diamond. Specific examples of the abrasive include powders such as alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, and diamond, among them, alumina powder such as α-alumina and silicon carbide powder are preferable. An average particle size of the abrasive is, for example, in a range of 30 to 300 nm, and preferably in a range of 50 to 200 nm.

From a viewpoint that the protrusion forming agent and the abrasive can more satisfactorily exhibit functions thereof, a content of the protrusion forming agent in the magnetic layer is preferably 1.0 to 4.0 parts by mass, and more preferably 1.5 to 3.5 parts by mass with respect to 100.0 parts by mass of the ferromagnetic powder. On the other hand, a content of the abrasive in the magnetic layer is preferably 1.0 to 20.0 parts by mass, more preferably 3.0 to 15.0 parts by mass, and still more preferably 4.0 to 10.0 parts by mass with respect to 100.0 parts by mass of the ferromagnetic powder.

As an example of the additive which can be used in the magnetic layer including the abrasive, a dispersing agent disclosed in paragraphs 0012 to 0022 of JP2013-131285A can be used as a dispersing agent for improving dispersibility of the abrasive in the magnetic layer forming composition. For the dispersing agent, descriptions disclosed in paragraphs 0061 and 0071 of JP2012-133837A can be referred to. The dispersing agent may be included in a non-magnetic layer. For the dispersing agent which may be included in the non-magnetic layer, a description disclosed in a paragraph 0061 of JP2012-133837A can be referred to.

Lubricant

Examples of the lubricant which is an aspect of the additive which can be included in the magnetic layer include one or more lubricants selected from the group consisting of a fatty acid, a fatty acid ester, and a fatty acid amide. $S_{0.5}$ and $S_{13.5}$ described above are values measured after n-hexane cleaning. In a case where a liquid film of the lubricant is present on the magnetic layer surface that is pressed during a spacing measurement, a spacing to be measured becomes narrow by a thickness of the liquid film. With respect to this, it is supposed that a lubricant that can present as a liquid film during pressing can be removed by n-hexane cleaning. Therefore, it is considered that by measuring a spacing after n-hexane cleaning, a measurement value of a spacing can be obtained as a value satisfactorily corresponding to a height of a protrusion of the magnetic layer surface in a pressed state.

As a fatty acid, for example, lauric acid, myristic acid, palmitic acid, stearic acid, oleic acid, linoleic acid, linolenic acid, behenic acid, erucic acid, elaidic acid, and the like can be used, among them, stearic acid, myristic acid, and palmitic acid are preferable, and stearic acid is more preferable. The fatty acid may be contained in the magnetic layer in a form of a salt such as a metal salt.

As a fatty acid ester, for example, esters such as lauric acid, myristic acid, palmitic acid, stearic acid, oleic acid, linoleic acid, linolenic acid, behenic acid, erucic acid, and elaidic acid can be used. Specific examples thereof can include, for example, butyl myristate, butyl palmitate, butyl stearate, neopentyl glycol dioleate, sorbitan mono stearate, sorbitan distearate, sorbitan tristearate, oleyl oleate, isocetyl stearate, isotridecyl stearate, octyl stearate, isooctyl stearate, amyl stearate, butoxyethyl stearate, and the like.

As a fatty acid amide, the amides of various fatty acids described above, such as lauric acid amide, myristic acid amide, palmitic acid amide, and stearic acid amide can be used.

For a fatty acid and a fatty acid derivative (amide, ester, and the like), a fatty acid-derived site of the fatty acid derivative preferably has the same or similar structure as that of the fatty acid to be used together. For example, in a case where stearic acid is used as the fatty acid as an example, it is preferable to use a stearic acid ester and/or a stearic acid amide.

A content of a fatty acid in the magnetic layer forming composition is, for example, 0 to 10.0 parts by mass, preferably 0.1 to 10.0 parts by mass, and more preferably 1.0 to 7.0 parts by mass per 100.0 parts by mass of the ferromagnetic powder. A content of a fatty acid ester in the magnetic layer forming composition is, for example, 0 to 10.0 parts by mass, preferably 0.1 to 10.0 parts by mass, and more preferably 1.0 to 7.0 parts by mass per 100.0 parts by mass of the ferromagnetic powder. A content of a fatty acid amide in the magnetic layer forming composition is, for example, 0 to 3.0 parts by mass, preferably 0 to 2.0 parts by mass, and more preferably 0 to 1.0 part by mass per 100.0 parts by mass of the ferromagnetic powder.

In a case where the magnetic recording medium has a non-magnetic layer between the non-magnetic support and the magnetic layer, a content of a fatty acid in a non-magnetic layer forming composition is, for example, 0 to 10.0 parts by mass, preferably 1.0 to 10.0 parts by mass, and more preferably 1.0 to 7.0 parts by mass per 100.0 parts by mass of the non-magnetic powder. A content of a fatty acid ester in the non-magnetic layer forming composition is, for example, 0 to 15.0 parts by mass, and preferably 0.1 to 10.0 parts by mass per 100.0 parts by mass of the non-magnetic powder. A content of a fatty acid amide in the non-magnetic layer forming composition is, for example, 0 to 3.0 parts by mass, and preferably 0 to 1.0 part by mass per 100.0 parts by mass of the non-magnetic powder.

Non-Magnetic Layer

Next, the non-magnetic layer will be described. The magnetic recording medium may include a magnetic layer on a non-magnetic support directly, or may include a non-magnetic layer including non-magnetic powder between the non-magnetic support and the magnetic layer. The non-magnetic layer includes non-magnetic powder and may further include a binding agent. The non-magnetic powder used in the non-magnetic layer may be powder of inorganic substance (inorganic powder) or powder of organic substance (organic powder). In addition, carbon black and the like can be used. Examples of the inorganic substance include metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-024113A can be referred to. The content (filling percentage) of the non-magnetic powder of the non-magnetic layer is preferably in a range of 50 to 90 mass % and more preferably in a range of 60 to 90 mass %.

In regards to other details of a binding agent or an additive of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the above magnetic recording medium also includes a substantially non-magnetic layer including a small amount of ferromagnetic powder as impurities, for example, or intentionally, together with the non-magnetic powder. Here, the substantially non-magnetic layer is a layer having a residual magnetic flux density equal to or smaller than 10 mT, a layer having a coercivity equal to or smaller than 100 Oe, or a layer having a residual magnetic flux density equal to or smaller than 10 mT and a coercivity equal to or smaller than 100 Oe. It is preferable that the non-magnetic layer does not have a residual magnetic flux density and a coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, and aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Back Coating Layer

The magnetic recording medium may include a back coating layer including non-magnetic powder on a surface side of the non-magnetic support opposite to the surface provided with the magnetic layer. Preferably, the back coating layer includes one or both of carbon black and inorganic powder as non-magnetic powder. The back coating layer may include a binding agent together with the non-magnetic powder. In regards to the binding agent included in the back coating layer and various additives which can be randomly included in the back coating layer, the well-known technology regarding the back coating layer can be applied, and the well-known technology regarding the treatment of the magnetic layer and/or the non-magnetic layer can be applied. For example, for the back coating layer, descriptions disclosed in paragraphs 0018 to 0020 of JP2006-331625A and page 4, line 65 to page 5, line 38 of U.S. Pat. No. 7,029,774B can be referred to.

Various Thicknesses

A thickness of the non-magnetic support is, for example, in a range of 3.0 to 80.0 μm, preferably in a range of 3.0 to 50.0 μm, and more preferably in a range of 3.0 to 10.0 μm.

A thickness of the magnetic layer is preferably 100 nm or less from a viewpoint of high density recording that has been demanded in recent years. The thickness of the magnetic layer is more preferably in a range of 10 nm to 100 nm, and still more preferably in a range of 20 to 90 nm. The magnetic layer may be at least a single layer, the magnetic layer may be separated into two or more layers having different magnetic properties, and a configuration of a well-known multilayered magnetic layer can be applied as the magnetic layer. A thickness of the magnetic layer in a case where the magnetic layer is separated into two or more layers is a total thickness of the layers.

A thickness of the non-magnetic layer is, for example, 0.1 to 1.5 μm, and preferably 0.1 to 1.0 μm.

A thickness of the back coating layer is preferably 0.9 μm or less, and more preferably in a range of 0.1 to 0.7 μm.

Thicknesses of each layer of the magnetic recording medium and the non-magnetic support can be obtained by a known film thickness measurement method. As an example, a cross section of the magnetic recording medium in a thickness direction is exposed by known means such as an ion beam or a microtome, and then the exposed cross section observation is performed using a scanning electron microscope, for example. In the cross section observation, various thicknesses can be obtained as a thickness obtained at one portion of the cross section, or an arithmetic average of thicknesses obtained at a plurality of portions of two or more portions, for example, two portions which are randomly extracted. In addition, the thickness of each layer may be obtained as a designed thickness calculated according to manufacturing conditions.

Manufacturing Method

A composition for forming the magnetic layer, the non-magnetic layer, or the back coating layer usually contains a solvent together with the various components described above. As a solvent, various organic solvents generally used for producing a coating type magnetic recording medium can be used. Among these, from a viewpoint of a solubility of a binding agent usually used for the coating type magnetic recording medium, it is preferable that each layer forming composition includes one or more ketone solvents such as acetone, methyl ethyl ketone, methyl isobutyl ketone, diisobutyl ketone, cyclohexanone, isophorone, and tetrahydrofuran. The amount of the solvent in each layer forming composition is not particularly limited, and can be the same as that of each layer forming composition of a normal coating type magnetic recording medium. Moreover, a step of preparing each layer forming composition can generally include at least a kneading step, a dispersing step, and a mixing step provided before and after these steps as necessary. Each step may be divided into two or more stages. The component used in the preparation of each layer forming composition may be added at an initial stage or in a middle stage of each step. In addition, each component may be separately added in two or more steps. For example, a binding agent may be separately added in a kneading step, a dispersing step, and a mixing step for adjusting viscosity after the dispersion. In a manufacturing process of the magnetic recording medium, a well-known manufacturing technique of the related art can be used in some or all of the steps. In the kneading step, preferably, a kneader having a strong kneading force such as an open kneader, a continuous kneader, a pressure kneader, or an extruder is used. Details of these kneading processes are disclosed in JP1989-106338A (JP-H01-106338A) and JP1989-079274A (JP-H01-079274A). Also, glass beads and/or other beads can be used to disperse each layer forming composition. As such dispersed beads, zirconia beads, titania beads, and steel beads which are dispersed beads having a high specific gravity are suitable. These dispersed beads are preferably used by optimizing the particle diameter (bead diameter) and filling rate. As a dispersing device, a well-known dispersing device can be used. Each layer forming composition may be filtered by a well-known method before being subjected to a coating step. The filtering can be performed by using a filter, for example. As the filter used in the filtering, a filter having a pore diameter of 0.01 to 3 μm (for example, filter made of glass fiber or filter made of polypropylene) can be used, for example.

In an aspect, in a step of preparing a magnetic layer forming composition, after preparing a dispersion liquid containing a protrusion forming agent (hereinafter, referred to as a "protrusion forming agent liquid"), the protrusion forming agent liquid can be mixed with various components of the magnetic layer forming composition such as ferromagnetic powder. For example, a dispersion liquid containing a protrusion forming agent liquid and an abrasive (hereinafter, referred to as an "abrasive liquid") and a dispersion liquid containing ferromagnetic powder (hereinafter, referred to as a "magnetic liquid") are separately prepared, and then mixed and dispersed, thereby preparing a magnetic layer forming composition. As described above, the separate preparation of various dispersion liquids is preferable for improving dispersibility of the ferromagnetic powder, the protrusion forming agent, and the abrasive in the magnetic layer forming composition.

Preferably, the protrusion forming agent liquid can be prepared by performing a dispersion process of the protrusion forming agent in an organic solvent containing an organic compound. The organic compound is preferably an alkyl group-containing compound. The number of carbon atoms of the alkyl group contained in the alkyl group-containing compound preferably has 5 or more, more preferably 6 or more, still more preferably 7 or more, and still more preferably 8 or more. Furthermore, the number of carbon atoms of the alkyl group, for example, can be 20 or less, 18 or less, or 16 or less. As the alkyl group, a chain alkyl group is preferable. The chain alkyl group may be a linear alkyl group or a branched alkyl group. It is considered that preparation of the protrusion forming agent liquid by performing a dispersion process in an organic solvent containing an alkyl group-containing compound mainly contributes to reduction of a value of a spacing $S_{13.5}$. The present inventors suppose that this may be because the alkyl group-containing compound exerts an effect of increasing an affinity between the protrusion forming agent (preferably, an organic resin particle) and other components (for example, a binding agent) in the magnetic layer, so that the protrusion forming agent can easily move in the magnetic layer, and as a result, in a case where a large pressure is applied, protrusions formed by the protrusion forming agent present on the magnetic layer surface can easily sink into the inside of the magnetic layer. The alkyl group may be unsubstituted or may have a substituent. Examples of the substituent include a hydroxy group, an alkoxy group (for example, an alkoxy group having 1 to 6 carbon atoms), a halogen atom (for example, a fluorine atom, a chlorine atom, and a bromine atom), a cyano group, an amino group, a nitro group, an acyl group, a carboxy group, or a salt form thereof. With respect to an alkyl group having a substituent, carbon atoms refer to carbon atoms in a portion not including a substituent. The number of alkyl groups contained in the alkyl group-containing compound can be one or more, two or more, for example, about two to three. In a case where the alkyl group-containing compound has two or more alkyl groups, the two or more alkyl groups may be the same alkyl group or different alkyl group. For example, in an aspect, the alkyl group-containing compound can be an organic amine compound. The organic amine compound may be any of primary amine, secondary amine, and tertiary amine. The primary amine can be represented by $RNH_2$, the secondary amine can be represented by $R_2NH$, and the tertiary amine can be represented by $R_3N$, each of which contains an alkyl group. R represents an alkyl group, and a plurality of alkyl groups R contained in the secondary amine and the tertiary amine may be the same alkyl group or different alkyl group. In addition, in another aspect, the alkyl group-containing compound can be an organic phosphorus compound. As an example of the organic phosphorus compound, an organic phosphonic acid can be used. An alkyl group-containing phosphonic acid can be represented by $RP(=O)(OH)_2$, and R represents an alkyl group. The protrusion forming agent liquid can be prepared, for example, as a dispersion liquid containing 2.0 to 20.0 parts by mass of a protrusion forming agent and 5.0 to 100.0 parts by mass of an organic solvent with respect to 1.0 part by mass of the organic compound (preferably, the alkyl group-containing compound). The dispersion liquid can be prepared by a known dispersion process such as ultrasonic processing. For example, the ultrasonic processing can be performed for about 1 to 300 minutes with an ultrasonic output of about 10 to 2,000 watts per 200 cc (1 cc=1 cm$^3$). Furthermore, filtering may be performed after the dispersion process. For a filter used for filtering, the above-mentioned description can be referred to. The organic solvent used for the preparation of the protrusion forming agent preferably contains one or more ketone solvents from a viewpoint of solubility of a binding agent usually used in a coating type magnetic recording medium. For the same reason, it is preferable that an abrasive liquid and a magnetic liquid also contain one or more ketone solvents.

The magnetic layer can be formed, for example, by directly applying the magnetic layer forming composition onto the non-magnetic support or performing multilayer coating of the magnetic layer forming composition with the non-magnetic layer forming composition in order or at the same time. In an aspect in which an orientation process is performed, the orientation process is performed on a coating layer of the magnetic layer forming composition in an orientation zone while the coating layer is in a wet state. For the orientation process, the various well-known technologies such as descriptions disclosed in a paragraph 0052 of JP2010-024113A can be used. For example, a vertical orientation process can be performed by a well-known method such as a method using a polar opposing magnet. In an orientation zone, a drying speed of the coating layer can be controlled depending on a temperature and a flow rate of dry air and/or a transportation speed in the orientation zone. In addition, the coating layer may be preliminarily dried before the transportation to the orientation zone.

The back coating layer can be formed by applying the back coating layer forming composition onto the side of the non-magnetic support opposite to the side provided with the magnetic layer (or on which the magnetic layer is to be provided). For details of coating for forming each layer, a description disclosed a paragraph 0066 of JP2010-231843A can be referred to. For details of other various processes for manufacturing the magnetic recording medium, descriptions disclosed paragraphs 0067 to 0070 of JP2010-231843A can be referred to.

It is possible to form a servo pattern in the magnetic recording medium manufactured as described above by a known method in order to enable tracking control of the magnetic head in the magnetic recording and reproducing apparatus, control of a running speed of the magnetic recording medium, and the like. The "formation of servo pattern" can also be referred to as "recording of servo signal". The magnetic recording medium may be a tape-shaped magnetic recording medium (magnetic tape) or may be a disk-shaped magnetic recording medium (magnetic disk). Hereinafter, the formation of the servo pattern will be described using a magnetic tape as an example.

The servo pattern is usually formed along a longitudinal direction of the magnetic tape. Examples of control (servo control) types using a servo signal include a timing-based servo (TBS), an amplitude servo, and a frequency servo.

As shown in a european computer manufacturers association (ECMA)-319, a magnetic tape (generally called "LTO tape") conforming to a linear tape-open (LTO) standard employs a timing-based servo type. In this timing-based servo type, the servo pattern is formed by continuously disposing a plurality of pairs of non-parallel magnetic stripes (also referred to as "servo stripes") in a longitudinal direction of the magnetic tape. As described above, the reason why the servo pattern is formed of a pair of non-parallel magnetic stripes is to indicate, to a servo signal reading element passing over the servo pattern, a passing position thereof. Specifically, the pair of magnetic stripes is formed so that an interval thereof continuously changes along a width direction of the magnetic tape, and the servo signal reading element reads the interval to thereby sense a relative position between the servo pattern and the servo signal reading element. Information on this relative position enables tracking on a data track. Therefore, a plurality of servo tracks are usually set on the servo pattern along a width direction of the magnetic tape.

A servo band is formed of servo signals continuous in a longitudinal direction of the magnetic tape. A plurality of servo bands are usually provided on the magnetic tape. For example, in an LTO tape, the number is five. A region interposed between two adjacent servo bands is referred to as a data band. The data band is formed of a plurality of data tracks, and each data track corresponds to each servo track.

Further, in an aspect, as shown in JP2004-318983A, information indicating a servo band number (referred to as "servo band identification (ID)" or "unique data band identification method (UDIM) information") is embedded in each servo band. This servo band ID is recorded by shifting a specific one of the plurality of pairs of the servo stripes in the servo band so that positions thereof are relatively displaced in a longitudinal direction of the magnetic tape. Specifically, a way of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

Incidentally, as a method for uniquely specifying the servo band, there is a method using a staggered method as shown in ECMA-319. In this staggered method, a group of pairs of non-parallel magnetic stripes (servo stripes) disposed continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading element elements.

As shown in ECMA-319, information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Here, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding information in the servo band, it is possible to employ a method other than the above. For example, a predetermined code may be recorded by thinning out a predetermined pair from the group of pairs of servo stripes.

A head for servo pattern forming head is called a servo write head. The servo write head has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 μm or less, 1 to 10 μm, 10 μm or more, and the like.

Before the servo pattern is formed on the magnetic tape, the magnetic tape is usually subjected to a demagnetization (erasing) process. This erasing process can be performed by applying a uniform magnetic field to the magnetic tape using a direct current magnet or an alternating current magnet. The erasing process includes direct current (DC) erasing and alternating current (AC) erasing. AC erasing is performed by gradually decreasing an intensity of the magnetic field while reversing a direction of the magnetic field applied to the magnetic tape. On the other hand, DC erasing is performed by applying a unidirectional magnetic field to the magnetic tape. As the DC erasing, there are two methods. A first method is horizontal DC erasing of applying a magnetic field in one direction along a longitudinal direction of the magnetic tape. A second method is vertical DC erasing of applying a magnetic field in one direction along a thickness direction of the magnetic tape. The erasing process may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. As shown in JP2012-053940A, in a case where a magnetic pattern is transferred to, using the gap, a magnetic tape that has been subjected to vertical DC erasing, a servo signal obtained by reading the formed servo pattern has a monopolar pulse shape. On the other hand, in a case where a magnetic pattern is transferred to, using the gap, a magnetic tape that has been subjected to horizontal DC erasing, a servo signal obtained by reading the formed servo pattern has a bipolar pulse shape.

The magnetic tape is usually accommodated in a magnetic tape cartridge, and the magnetic tape cartridge is attached to a magnetic recording and reproducing apparatus.

In the magnetic tape cartridge, generally, the magnetic tape is accommodated inside a cartridge body in a state of being wound around a reel. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic recording and reproducing apparatus for recording and/or reproducing data on the magnetic tape, the magnetic tape is pulled out of the magnetic tape cartridge to be wound around the reel on the magnetic recording and reproducing apparatus side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic recording and reproducing apparatus side. During this time, data is recorded and/or reproduced as the magnetic head and the magnetic layer surface of the magnetic tape come into contact with each other to be slid on each other. With respect to this, in the dual reel type magnetic tape cartridge, both reels of the supply reel and the winding reel are provided in the magnetic tape cartridge. The magnetic tape cartridge may be either a single reel type or a dual reel type magnetic tape cartridge. For other details of the magnetic tape cartridge, the well-known technologies can be applied.

According to the magnetic recording medium according to an aspect of the present invention described above, it is possible to suppress a deterioration of electromagnetic conversion characteristics after exposure to a temperature change from a low temperature to a high temperature under a high humidity. As an example, a high humidity can be, for example, an environment with a relative humidity of about 70° C. to 100° C., a low temperature can be, for example, about more than 0° C. and 15° C. or less, a high temperature can be, for example, about 30° C. to 50° C., and a temperature change from a low temperature to a high temperature can be, for example, a temperature change of about 15° C. to 50° C.

Magnetic Recording and Reproducing Apparatus

Another aspect of the present invention relates to a magnetic recording and reproducing apparatus including the magnetic recording medium described above, and a magnetic head.

In the present invention and this specification, the "magnetic recording and reproducing apparatus" means an apparatus capable of performing at least one of the recording of data on the magnetic recording medium or the reproducing of data recorded on the magnetic recording medium. Such an apparatus is generally called a drive. The magnetic recording and reproducing apparatus can be a sliding type magnetic recording and reproducing apparatus. The sliding type magnetic recording and reproducing apparatus is an apparatus in which the magnetic layer surface and the magnetic head come into contact with each other to be slid on each other, in a case of performing the recording of data on the magnetic recording medium and/or reproducing of the recorded data.

The magnetic head included in the magnetic recording and reproducing apparatus can be a recording head capable of performing the recording of data on the magnetic recording medium, or can be a reproducing head capable of performing the reproducing of data recorded on the magnetic recording medium. In addition, in an aspect, the magnetic recording and reproducing apparatus can include both of a recording head and a reproducing head as separate magnetic heads. In another aspect, the magnetic head included in the magnetic recording and reproducing apparatus can have a configuration that both of an element for recording data (recording element) and an element for reproducing data (reproducing element) are included in one magnetic head. Hereinafter, the element for recording and the element for reproducing data are collectively referred to as an "element for data". As the reproducing head, a magnetic head (MR head) including a magnetoresistive (MR) element capable of sensitively reading data recorded on the magnetic tape as a reproducing element is preferable. As the MR head, various known MR heads such as an anisotropic magnetoresistive (AMR) head, a giant magnetoresistive (GMR) head, and a tunnel magnetoresistive (TMR) head can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) comprising a servo signal reading element may be included in the magnetic recording and reproducing apparatus. For example, a magnetic head that records data and/or reproduces recorded data (hereinafter also referred to as "recording and reproducing head") can include two servo signal reading elements, and the two servo signal reading elements can read two adjacent servo bands simultaneously. One or a plurality of elements for data can be disposed between the two servo signal reading elements.

In the magnetic recording and reproducing apparatus, recording of data on the magnetic recording medium and/or reproducing of data recorded on the magnetic recording medium can be performed as the magnetic layer surface of the magnetic recording medium and the magnetic head come into contact with each other to be slid on each other. The magnetic recording and reproducing apparatus has only to include the magnetic recording medium according to an aspect of the present invention, and the well-known technology can be applied to the others.

For example, in a case of recording data and/or reproducing the recorded data on a magnetic recording medium in which a servo pattern is formed, first, tracking using a servo signal obtained by reading a servo pattern is performed. That is, by causing the servo signal reading element to follow a predetermined servo track, the element for data is controlled to pass on the target data track. Displacement of the data track is performed by changing a servo track to be read by the servo signal reading element in a tape width direction.

The recording and reproducing head can also perform recording and/or reproducing with respect to other data bands. In this case, the servo signal reading element may be displaced to a predetermined servo band using the above described UDIM information, and tracking for the servo band may be started.

EXAMPLES

Hereinafter, the present invention will be described with reference to examples. Here, the present invention is not limited to aspects shown in the examples. "Part" described below indicates "parts by mass". In addition, steps and evaluations described below were performed in an environment of an atmosphere temperature of 23° C.±1° C., unless otherwise noted. "eq" in the following description is an equivalent and is a unit that cannot be converted into SI unit.

Protrusion Forming Agent

A protrusion forming agent used for manufacturing a magnetic recording medium of the examples or the comparative examples is as follows.

Protrusion forming agent 1 (organic resin particle): EPOSTAR MX050W manufactured by Nippon Shokubai Co., Ltd. (acrylic cross-linked resin), an average particle size of 70 nm, a density of 1.2 g/cm$^3$ Protrusion forming agent 2 (organic resin particle): EPOSTAR MX100W manufactured by Nippon Shokubai Co., Ltd. (acrylic cross-linked resin), an average particle size of 150 nm, a density of 1.2 g/cm$^3$ Protrusion forming agent 3 (organic resin particle): EPOSTAR MX200W manufactured by Nippon Shokubai Co., Ltd. (acrylic cross-linked resin), an average particle size of 350 nm, a density of 1.2 g/cm$^3$ Protrusion forming agent 4 (organic resin particle): EPOSTAR SS manufactured by Nippon Shokubai Co., Ltd. (melamine/formaldehyde condensate), an average particle size of 100 nm, a density of 1.5 g/cm$^3$ Protrusion forming agent 5 (organic resin particle): DyneonTF9207Z manufactured by 3M Company (polytetrafluoroethylene (PTFE)), an average particle size of 120 nm, and a density of 2.0 g/cm$^3$ Protrusion forming agent 6: Asahi #50 manufactured by Asahi Carbon Co., Ltd. (carbon black), an average particle size of 300 nm, a density of 1.9 g/cm$^3$ Protrusion forming agent 7: PL-10L manufactured by Fuso Chemical Co., Ltd. (water-dispersed sol of silica particle; as a protrusion forming agent for preparing a protrusion forming agent described later, a dried product obtained by heating the water-dispersed sol and removing a solvent is used), an average particle size of 130 nm, a density of 2.2 g/cm$^3$ Ferromagnetic Powder In Table 1, "BaFe" is hexagonal barium ferrite powder having an average particle size of 12 nm.

In Table 1, "SrFe1" is hexagonal strontium ferrite powder manufactured by the following method.

1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ were weighed and mixed using a mixer to obtain a raw material mixture.

The obtained raw material mixture was melted in a platinum crucible at a melting temperature of 1390° C., and a hot water outlet provided at a bottom of the platinum crucible was heated while stirring a melt, and the melt was discharged in a rod shape at about 6 g/sec. Hot water was rolled and quenched by a water-cooled twin roller to manufacture an amorphous body.

280 g of the manufactured amorphous body was charged into an electric furnace, was heated to 635° C. (crystallization temperature) at a heating rate of 3.5° C./min, and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 ml of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving process of a glass component, and then the crystallized product was sedimented by a centrifugal separator to be washed by repeatedly performing decantation and was dried in a heating furnace at an internal temperature of the furnace of 110° C. for 6 hours to obtain hexagonal strontium ferrite powder.

An average particle size of the hexagonal strontium ferrite powder obtained above was 18 nm, an activation volume was 902 nm$^3$, an anisotropy constant Ku was 2.2×10$^5$ J/m$^3$ and a mass magnetization us was 49 A·m$^2$/kg.

12 mg of sample powder was taken from the hexagonal strontium ferrite powder obtained above, elemental analysis of the filtrated solution obtained by partially dissolving this sample powder under dissolution conditions illustrated above was performed by an ICP analyzer, and a surface layer portion content of a neodymium atom was determined.

Separately, 12 mg of sample powder was taken from the hexagonal strontium ferrite powder obtained above, elemental analysis of the filtrated solution obtained by totally dissolving this sample powder under dissolution conditions illustrated above was performed by an ICP analyzer, and a bulk content of a neodymium atom was determined.

A content (bulk content) of a neodymium atom with respect to 100 at % of an iron atom in the hexagonal strontium ferrite powder obtained above was 2.9 at %. A surface layer portion content of a neodymium atom was 8.0 at %. It was confirmed that a ratio between a surface layer portion content and a bulk content, that is, "surface layer portion content/bulk content" was 2.8, and a neodymium atom was unevenly distributed in a surface layer of a particle.

The fact that the powder obtained above shows a crystal structure of hexagonal ferrite was confirmed by performing scanning with CuKα rays under conditions of a voltage of 45 kV and an intensity of 40 mA and measuring an X-ray diffraction pattern under the following conditions (X-ray diffraction analysis). The powder obtained above showed a crystal structure of hexagonal ferrite of a magnetoplumbite type (M type). A crystal phase detected by X-ray diffraction analysis was a single phase of a magnetoplumbite type.

PANalytical X'Pert Pro analyzer, PIXcel detector
Soller slit of incident beam and diffracted beam: 0.017 radians
Fixed angle of dispersion slit: ¼ degrees
Mask: 10 mm
Anti-scattering slit: ¼ degrees
Measurement mode: continuous
Measurement time per stage: 3 seconds
Measurement speed: 0.017 degrees per second
Measurement step: 0.05 degrees In Table 1, "SrFe2" is hexagonal strontium ferrite powder manufactured by the following method.

1725 g of $SrCO_3$, 666 g of $H_3BO_3$, 1332 g of $Fe_2O_3$, 52 g of $Al(OH)_3$, 34 g of $CaCO_3$, and 141 g of $BaCO_3$ were weighed and mixed using a mixer to obtain a raw material mixture.

The obtained raw material mixture was melted in a platinum crucible at a melting temperature of 1380° C., and a hot water outlet provided at a bottom of the platinum crucible was heated while stirring a melt, and the melt was discharged in a rod shape at about 6 g/sec. Hot water was quenched and rolled by a water-cooled twin roller to manufacture an amorphous body.

280 g of the obtained amorphous body was charged into an electric furnace, was heated to 645° C. (crystallization temperature), and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 ml of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving process of a glass component, and then the crystallized product was sedimented by a centrifugal separator to be washed by repeatedly performing decantation and was dried in a heating furnace at an internal temperature of the furnace of 110° C. for 6 hours to obtain hexagonal strontium ferrite powder.

An average particle size of the obtained hexagonal strontium ferrite powder was 19 nm, an activation volume was 1102 $nm^3$, an anisotropy constant Ku was $2.0 \times 10^5$ $J/m^3$, and a mass magnetization as was 50 A·$m^2$/kg.

In Table 1, "ε-iron oxide" is ε-iron oxide powder manufactured by the following method.

8.3 g of iron (III) nonahydrate, 1.3 g of gallium (III) nitrate octahydrate, 190 mg of cobalt (II) nitrate hexahydrate, 150 mg of titanium (IV) sulfate, and 1.5 g of polyvinylpyrrolidone (PVP) were dissolved in 90 g of pure water, and while the dissolved product was stirred using a magnetic stirrer, 4.0 g of an aqueous ammonia solution having a concentration of 25% was added to the dissolved product under an atmosphere temperature of 25° C. in an air atmosphere, and the resultant was stirred for 2 hours while maintaining a temperature condition of the atmosphere temperature of 25° C. A citric acid solution obtained by dissolving 1 g of citric acid in 9 g of pure water was added to the obtained solution, and the mixture was stirred for 1 hour. The powder sedimented after stirring was collected by centrifugal separation, was washed with pure water, and was dried in a heating furnace at a furnace temperature of 80° C.

800 g of pure water was added to the dried powder, and the powder was dispersed again in water to obtain dispersion liquid. The obtained dispersion liquid was heated to a liquid temperature of 50° C., and 40 g of an aqueous ammonia solution having a concentration of 25% was dropwise added with stirring. After stirring for 1 hour while maintaining the temperature at 50° C., 14 mL of tetraethoxysilane (TEOS) was dropwise added and was stirred for 24 hours. Powder sedimented by adding 50 g of ammonium sulfate to the obtained reaction solution was collected by centrifugal separation, was washed with pure water, and was dried in a heating furnace at a furnace temperature of 80° C. for 24 hours to obtain a ferromagnetic powder precursor.

The obtained ferromagnetic powder precursor was loaded into a heating furnace at a furnace temperature of 1000° C. in an air atmosphere and was heat-treated for 4 hours.

The heat-treated ferromagnetic powder precursor was put into an aqueous solution of 4 mol/L sodium hydroxide (NaOH), and the liquid temperature was maintained at 70° C. and was stirred for 24 hours, whereby a silicic acid compound as an impurity was removed from the heat-treated ferromagnetic powder precursor.

Thereafter, the ferromagnetic powder from which the silicic acid compound was removed was collected by centrifugal separation, and was washed with pure water to obtain a ferromagnetic powder.

The composition of the obtained ferromagnetic powder that was checked by high-frequency inductively coupled plasma-optical emission spectrometry (ICP-OES) has Ga, Co, and a Ti substitution type ε-iron oxide (ε-$Ga_{0.58}Fe_{1.42}O_3$). In addition, X-ray diffraction analysis is performed under the same condition as that described above for SrFe1, and from a peak of an X-ray diffraction pattern, it is checked that the obtained ferromagnetic powder does not include α-phase and γ-phase crystal structures, and has a single-phase and ε-phase crystal structure (ε-iron oxide type crystal structure).

An average particle size of the obtained s-iron oxide powder was 12 nm, an activation volume was 746 $nm^3$, an anisotropy constant Ku was $1.2 \times 10^5$ $J/m^3$, and a mass magnetization σs was 16 A·$m^2$/kg.

The activation volume and the anisotropy constant Ku of each of the above hexagonal strontium ferrite powder and ε-iron oxide powder are values obtained by the method described above for each ferromagnetic powder using a vibrating sample magnetometer (manufactured by Toei Kogyo Co., Ltd.).

In addition, the mass magnetization σs is a value measured at a magnetic field intensity of 15 kOe using a vibrating sample magnetometer (manufactured by Toei Kogyo Co., Ltd.).

Example 1

Magnetic Layer Forming Composition
Magnetic Liquid
Ferromagnetic powder (see Table 1): 100.0 parts
Oleic acid: 2.0 parts
Vinyl chloride copolymer (MR-104 manufactured by Kaneka Corporation): 10.0 parts
SO$_3$Na group-containing polyurethane resin: 4.0 parts
(weight-average molecular weight of 70,000, So$_3$Na group: 0.07 meq/g)
Additive A: 10.0 parts
Methyl ethyl ketone: 150.0 parts
Cyclohexanone: 150.0 parts
Abrasive Liquid
α-Alumina (average particle size: 110 nm): 6.0 parts
Vinyl chloride copolymer (MR110 manufactured by Kaneka Corporation): 0.7 parts
Cyclohexanone: 20.0 parts
Protrusion Forming Agent Liquid
Protrusion forming agent (see Table 1): 1.3 parts
Organic compound (see Table 1): 0.3 parts
Methyl ethyl ketone: 9.0 parts
Cyclohexanone: 6.0 parts
Lubricant and Curing Agent Liquid
Stearic acid: 3.0 parts
Stearic acid amide: 0.3 parts
Butyl stearate: 6.0 parts
Methyl ethyl ketone: 110.0 parts
Cyclohexanone: 110.0 parts
Polyisocyanate (CORONATE (registered trademark) L manufactured by Tosoh Corporation): 3.0 parts The above additive A is a polymer synthesized by a method described in paragraphs 0115 to 0123 of JP2016-051493A.

Non-Magnetic Layer Forming Composition
Non-magnetic inorganic powder (α-iron oxide): 80.0 parts
(average particle size: 0.15 μm, average acicular ratio: 7, brunauer-emmett-teller (BET) specific surface area: 52 m$^2$/g)
Carbon black (average particle size: 20 nm): 20.0 parts
Electron beam-curable vinyl chloride copolymer: 13.0 parts
Electron beam-curable polyurethane resin: 6.0 parts
Phenylphosphonic acid: 3.0 parts
Cyclohexanone: 140.0 parts
Methyl ethyl ketone: 170.0 parts
Butyl stearate: 2.0 parts
Stearic acid: 1.0 part
List of Back Coating Layer Forming Composition
Non-magnetic inorganic powder (cε-iron oxide): 80.0 parts
(average particle size: 0.15 μm, average acicular ratio: 7, BET specific surface area: 52 m$^2$/g)
Carbon black (average particle size: 20 nm): 20.0 parts
Carbon black (average particle size: 100 nm): 3.0 parts
Vinyl chloride copolymer: 13.0 parts
Sulfonic acid group-containing polyurethane resin: 6.0 parts
Phenylphosphonic acid: 3.0 parts
Cyclohexanone: 140.0 parts
Methyl ethyl ketone: 170.0 parts
Stearic acid: 3.0 parts
Polyisocyanate (CORONATE manufactured by Tosoh Corporation): 5.0 parts
Methyl ethyl ketone: 400.0 parts Preparation of Each Layer Forming Composition The magnetic layer forming composition was prepared by the following method.

The components of the magnetic liquid were kneaded and diluted by an open kneader, and then subjected to dispersion processes of 12 passes, with a horizontal beads mill dispersing device using zirconia (ZrO$_2$) beads (hereinafter, referred to as "Zr beads") having a bead diameter of 0.5 mm by setting a retention time per pass to 2 minutes at a bead filling rate of 80 vol % and a rotor tip circumferential speed of 10 msec.

Components of the above abrasive liquid were mixed and then the mixture was put in a vertical sand mill dispersing device together with Zr beads having a bead diameter of 1 mm, and a bead volume/(an abrasive liquid volume+a bead volume) was adjusted to be 60%, and a sand mill dispersion process was performed for 180 minutes. The liquid after the process was taken out and subjected to an ultrasonic dispersion filtration process using a flow type ultrasonic dispersion filtration device.

The protrusion forming agent liquid was prepared by mixing components of the above protrusion forming agent liquid and then filtering, through a filter having a pore diameter of 0.5 μm, a dispersion liquid obtained by ultrasonic processing (dispersion process) for 60 minutes at an ultrasonic output of 500 watts per 200 cc with a horn type ultrasonic dispersing device.

The magnetic liquid, the abrasive liquid, the protrusion forming agent liquid, the lubricant, and the curing agent liquid were introduced into a dissolver stirrer and stirred for 30 minutes at a circumferential speed of 10 msec, and then subjected to processes of 3 passes at a flow rate of 7.5 kg/min by a flow type ultrasonic dispersing device, and thereafter a magnetic layer forming composition was prepared by filtration through a filter having a pore diameter of 1 μm.

The non-magnetic layer forming composition was prepared by the following method.

The above components excluding the lubricant (butyl stearate and stearic acid) were kneaded and diluted with an open kneader, and then dispersed with a horizontal beads mill dispersing device. Thereafter, the lubricant (butyl stearate and stearic acid) were added, and the resultant was stirred with a dissolver stirrer to perform a mixing process. Thereby, a non-magnetic layer forming composition was prepared.

The back coating layer forming composition was prepared by the following method.

The above components excluding the lubricant (stearic acid), the polyisocyanate, and the methyl ethyl ketone (400.0 parts) were kneaded and diluted with an open kneader, and then dispersed with a horizontal beads mill dispersing device. Thereafter, the lubricant (stearic acid), the polyisocyanate, and the methyl ethyl ketone (400.0 parts) were added, and the resultant was stirred with a dissolver stirrer to perform a mixing process. Thereby, a back coating layer forming composition was prepared.

Manufacturing of Magnetic Tape

The non-magnetic layer forming composition was applied onto a biaxially stretched polyethylene naphthalate support having a thickness of 6.0 μm and dried so that a thickness after drying becomes 1.0 μm, and then an electron beam was emitted with an energy of 40 kGy at an acceleration voltage of 125 kV, and thus a non-magnetic layer was formed. The magnetic layer forming composition was applied onto the formed non-magnetic layer so that a thickness after the drying becomes 50 nm, and thus a coating layer was formed. While the formed coating layer is in a wet state (so-called undried state), a magnetic field of a magnetic field intensity of 0.60 T was applied onto a surface of the coating layer in a direction perpendicular thereto by using electromagnets arranged opposite each other, and a vertical orientation process was performed and then a drying process was performed, and thus a magnetic layer was formed. Furthermore, the back coating layer forming composition was applied onto the surface of the support on a side opposite to the surface where the non-magnetic layer and the magnetic layer are formed and dried so that a thickness after the drying becomes 0.5 μm, and thus a back coating layer was formed.

After that, a calendering process was performed using a seven-stage calender roll configured with only a metal roll, under conditions of a calendering speed of 80 m/min, a linear pressure of 294 kN/m, and a calender temperature of 80° C. (surface temperature of a calender roll). Then, heat treatment was performed in an environment of an atmosphere temperature of 70° C. for 36 hours. After the heat treatment, slitting was performed so as to have a width of ½ inches (1 inch is 0.0254 meters), and the magnetic layer surface was cleaned by a tape cleaning device in which a nonwoven fabric and a razor blade are attached to a device including a sending and winding device of a slit product so as to press the magnetic layer surface, and thus a magnetic tape was obtained.

Examples 2 to 14 and Comparative Examples 1 to 9

A magnetic tape was obtained by the same method as in Example 1 except that one or more of the type of the protrusion forming agent, the presence or absence or the type of the organic compound, and the type of the ferromagnetic powder were changed as shown in Table 1.

Evaluation Method (1) Difference ($S_{0.5}-S_{13.5}$)

Using a tape spacing analyzer (TSA; manufactured by Micro Physics), spacings $S_{0.5}$ and $S_{13.5}$ after n-hexane cleaning were measured by the following method, and a difference ($S_{0.5}-S_{13.5}$) was calculated from the measured values.

Five sample pieces having a length of 5 cm were cut from each of the magnetic tapes of the examples and the comparative examples, and each sample piece was subjected to n-hexane cleaning by the method described above, and then $S_{0.5}$ and $S_{13.5}$ were obtained by the following method.

In a state where a glass plate (a glass plate manufactured by Thorlabs, Inc. (model number: WG10530)) provided in TSA was disposed on the magnetic layer surface of the magnetic tape (that is, the above sample piece), using a urethane hemisphere provided in the TSA as a pressing member, the hemisphere was pressed against a surface of the back coating layer of the magnetic tape at a pressure of 0.5 atm. In this state, white light was emitted from a stroboscope provided in the TSA to a certain region (150,000 to 200,000 μm²) on the magnetic layer surface of the magnetic tape through a glass plate, and the obtained reflected light was received by a charge-coupled device (CCD) through an interference filter (a filter that selectively transmits light having a wavelength of 633 nm), and thus an interference fringe image generated in an unevenness of this region was obtained.

This image was divided into 300,000 points to obtain a distance (spacing) from the magnetic tape side surface of the glass plate to the magnetic layer surface of the magnetic tape of each point, and this was used as a histogram, and thus a mode value of the histogram was used as a spacing.

The same sample piece was further pressed, and a spacing was obtained by the same method as described above under a pressure of 13.5 atm.

An arithmetic average of spacings obtained after n-hexane cleaning for five sample pieces under a pressure of 0.5 atm was defined as a spacing $S_{0.5}$, and an arithmetic average of spacings obtained after n-hexane cleaning for five sample pieces under a pressure of 13.5 atm was defined as a spacing $S_{13.5}$. Such obtained spacing $S_{0.5}$, spacing $S_{13.5}$, and difference ($S_{0.5}-S_{13.5}$) are shown in Table 1.

(2) SNR Decrease after Temperature Change from Low Temperature to High Temperature Under High Humidity (i) Under an environment of an atmosphere temperature of 23° C. and a relative humidity of 50%, for each of the magnetic tapes of the examples and the comparative examples, a recording head (a metal-in-gap (MIG) head, a gap length of 0.15 μm, a track width of 1.0 μm, 1.8 T) and a reproducing head (a giant magnetoresistive (GMR) head, an element thickness of 15 nm, a shield spacing of 0.1 μm, a track width of 1.0 μm) were attached to a loop tester, and a signal having a linear recording density of 325 kfci was recorded. The unit kfci is a unit (cannot be converted to an SI unit system) of a linear recording density. After that, the reproducing output was measured, and a signal-to-noise-ratio (SNR) was obtained as a ratio between the reproducing output and a noise. An SNR was obtained as a relative value when an SNR of Comparative Example 1 was 0 dB.

(ii) After evaluating the SNR in the above (i), each of the magnetic tapes of the examples and the comparative examples was stored for 3 hours in a thermo box of which the inside was maintained at a temperature of 10° C. and a relative humidity of 80%. Thereafter, the magnetic tape was taken out from the thermo box (outside air is at a temperature of 23° C. and a relative humidity of 50%) and put in a thermo room of which the inside was maintained at a temperature of 32° C. and a relative humidity of 80% within 1 minute, and then recording and reproducing were performed in the thermo room within 30 minutes in the same manner as in the above (i), and thus an SNR was obtained as a relative value when the SNR of Comparative Example 1 obtained in the above (i) was 0 dB. For each of the magnetic tapes of the examples and the comparative examples, a difference ("SNR obtained in (ii)"–"SNR obtained in the above (i)") between the SNR obtained here and the SNR obtained in the above (i) was calculated and used as an SNR decrease. In a case where the SNR decrease obtained here is within −1.0 dB, it can be evaluated that decrease in an SNR after exposure to a temperature change from a low temperature to a high temperature under a high humidity is suppressed.

The results are shown in Table 1.

TABLE 1

| | Ferromagnetic powder | Protrusion forming agent liquid | | $S_{0.5}$ (nm) | $S_{13.5}$ (nm) | $S_{0.5} - S_{13.5}$ (nm) | SNR decrease |
| --- | --- | --- | --- | --- | --- | --- | --- |
| | | Protrusion forming agent | Organic compound | | | | |
| Example 1 | BaFe | Protrusion forming agent 1 | Tridecylamine | 15.3 | 4.8 | 10.5 | −0.3 dB |
| Example 2 | BaFe | Protrusion forming agent 2 | | 25.2 | 10.2 | 15.0 | −0.3 dB |
| Example 3 | BaFe | Protrusion forming agent 3 | | 34.9 | 14.3 | 20.6 | −0.3 dB |
| Example 4 | BaFe | Protrusion forming agent 4 | | 24.8 | 13.2 | 11.6 | −0.4 dB |
| Example 5 | BaFe | Protrusion forming agent 5 | | 23.5 | 11.1 | 12.4 | −0.6 dB |
| Example 6 | BaFe | Protrusion forming agent 2 | Trioctylamine | 21.3 | 9.8 | 11.5 | −0.4 dB |
| Example 7 | BaFe | Protrusion forming agent 3 | | 21.1 | 10.2 | 10.9 | −0.5 dB |
| Example 8 | BaFe | Protrusion forming agent 4 | | 20.8 | 11.1 | 9.7 | −0.9 dB |
| Example 9 | BaFe | Protrusion forming agent 2 | Octylphosphonic acid | 18.9 | 9.8 | 9.1 | −0.8 dB |
| Example 10 | BaFe | Protrusion forming agent 3 | | 18.7 | 9.0 | 9.7 | −0.9 dB |
| Example 11 | BaFe | Protrusion forming agent 4 | | 19.1 | 10.0 | 9.1 | −0.9 dB |
| Example 12 | SrFe1 | Protrusion forming agent 2 | Tridecylamine | 25.2 | 10.2 | 15.0 | −0.4 dB |
| Example 13 | SrFe2 | Protrusion forming agent 2 | | 25.6 | 10.5 | 15.1 | −0.4 dB |
| Example 14 | ε-Iron oxide | Protrusion forming agent 2 | | 23.2 | 9.8 | 13.4 | −0.5 dB |
| Comparative Example 1 | BaFe | Protrusion forming agent 1 | None | 16.8 | 8.4 | 8.4 | −1.3 dB |
| Comparative Example 2 | BaFe | Protrusion forming agent 2 | | 22.6 | 13.8 | 8.8 | −1.1 dB |
| Comparative Example 3 | BaFe | Protrusion forming agent 3 | | 28.3 | 19.8 | 8.5 | −1.3 dB |
| Comparative Example 4 | BaFe | Protrusion forming agent 4 | | 22.1 | 13.6 | 8.5 | −1.5 dB |
| Comparative Example 5 | BaFe | Protrusion forming agent 5 | | 21.5 | 13.1 | 8.4 | −1.9 dB |
| Comparative Example 6 | BaFe | Protrusion forming agent 6 | Tridecylamine | 27.8 | 20.0 | 7.8 | −2.1 dB |
| Comparative Example 7 | BaFe | | None | 29.8 | 22.4 | 7.4 | −2.6 dB |
| Comparative Example 8 | BaFe | Protrusion forming agent 7 | Tridecylamine | 10.7 | 7.0 | 3.7 | −3.1 dB |
| Comparative Example 9 | BaFe | | None | 10.8 | 7.3 | 3.5 | −3.5 dB |

From the results shown in Table 1, it can be confirmed that in the magnetic tape of the examples, the SNR decrease after a temperature change from a low temperature to a high temperature under a high humidity is suppressed as compared with the magnetic tape of the comparative examples.

An aspect of the present invention is useful in the technical field of various data storage magnetic recording media.

What is claimed is:

1. A magnetic recording medium comprising:
a non-magnetic support; and
a magnetic layer including ferromagnetic powder,
wherein a difference $S_{0.5}-S_{13.5}$ between a spacing $S_{0.5}$ measured on a surface of the magnetic layer by optical interferometry after n-hexane cleaning under a pressure of 0.5 atm and a spacing $S_{13.5}$ measured on the surface of the magnetic layer by optical interferometry after n-hexane cleaning under a pressure of 13.5 atm is 9.0 nm or more.

2. The magnetic recording medium according to claim 1, wherein the difference is 9.0 nm or more and 30.0 nm or less.

3. The magnetic recording medium according to claim 1, wherein the difference is 10.0 nm or more and 30.0 nm or less.

4. The magnetic recording medium according to claim 1, wherein the magnetic layer includes an organic resin particle.

5. The magnetic recording medium according to claim 1, wherein the magnetic layer includes a compound which contains an alkyl group having 5 or more carbon atoms.

6. The magnetic recording medium according to claim 5, wherein the compound is an organic amine compound.

7. The magnetic recording medium according to claim 5, wherein the compound is an organic phosphorus compound.

8. The magnetic recording medium according to claim 1, wherein the magnetic layer includes one or more lubricants selected from the group consisting of a fatty acid, a fatty acid ester, and a fatty acid amide.

9. The magnetic recording medium according to claim 1, further comprising:
a non-magnetic layer including non-magnetic powder between the non-magnetic support and the magnetic layer.

10. The magnetic recording medium according to claim 1, further comprising:
a back coating layer including non-magnetic powder on a surface side of the non-magnetic support opposite to a surface side provided with the magnetic layer.

11. The magnetic recording medium according to claim 1, which is a magnetic tape.

12. A magnetic recording and reproducing apparatus comprising:
the magnetic recording medium according to claim 1; and
a magnetic head.

13. The magnetic recording and reproducing apparatus according to claim 12,
wherein the difference is 9.0 nm or more and 30.0 nm or less.

14. The magnetic recording and reproducing apparatus according to claim 12,
wherein the difference is 10.0 nm or more and 30.0 nm or less.

15. The magnetic recording and reproducing apparatus according to claim 12,
wherein the magnetic layer includes an organic resin particle.

16. The magnetic recording and reproducing apparatus according to claim 12,
wherein the magnetic layer includes a compound which contains an alkyl group having 5 or more carbon atoms.

17. The magnetic recording and reproducing apparatus according to claim 16,
wherein the compound is an organic amine compound.

18. The magnetic recording and reproducing apparatus according to claim 16,
wherein the compound is an organic phosphorus compound.

19. The magnetic recording and reproducing apparatus according to claim 12,
wherein the magnetic layer includes one or more lubricants selected from the group consisting of a fatty acid, a fatty acid ester, and a fatty acid amide.

* * * * *